Oct. 25, 1932.  J. D. BALDWIN, JR  1,885,042
HYDRAULIC COUPLING
Filed May 18, 1929

INVENTOR
John D. Baldwin Jr.

BY

ATTORNEYS

Patented Oct. 25, 1932

1,885,042

UNITED STATES PATENT OFFICE

JOHN D. BALDWIN, JR., OF CLEVELAND, OHIO, ASSIGNOR TO ALBERT J. WEATHERHEAD, JR., OF CLEVELAND, OHIO

HYDRAULIC COUPLING

Application filed May 18, 1929. Serial No. 364,298.

Figure 1:
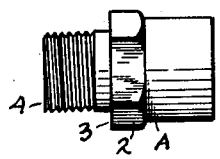
Figure 3:
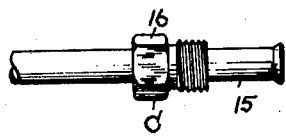
Figure 2:
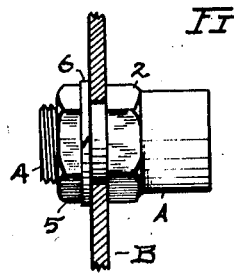

My invention relates to hydraulic couplings, and my object in general is to provide a coupling member of simple construction and design which may be used advantageously in a hydraulic brake system for automobiles. Thus as constructed the device is relatively short and small and includes means for attaching the same rigidly to a wall, bracket or other part of an automobile, and also means for securing two tubes or pipes of different diameter and kind together with fluid-tight sealing effect, all substantially as herein described and also exemplified in the accompanying drawing, in which Fig. 1 is a side elevation of the coupling member per se; and Fig. 2 a side view of the coupling member attached to a plate or bracket; Fig. 3 a side view of a flanged tube and a coupling nut thereon; and Fig. 4 an enlarged sectional view of the coupling and a flanged tube secured together and attached to a plate or bracket.

Figure 4:
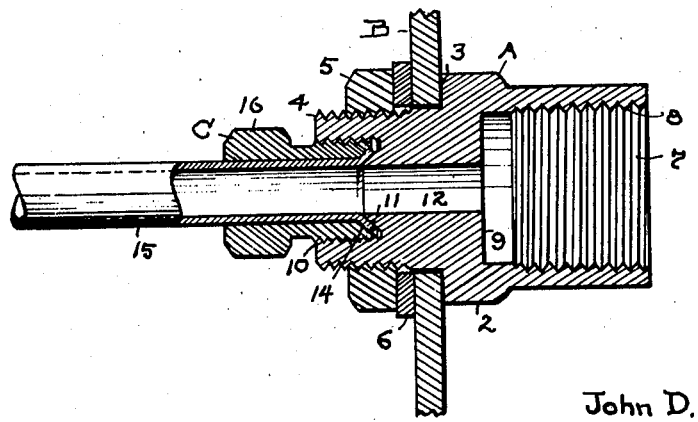

The main body A of this coupling device is produced from a metal rod or bar of angular cross section, preferably a hexagonal rod or bar, which is turned down to different diameters at spaced intervals and severed into pieces. In these operations, a hexagonal wrench-engaging enlargement 2 is produced, and a flat shoulder 3 formed at the base of a short cylindrical shank, 4, which is then screw-threaded externally for a part of its length. Shank 4 is provided to permit body A to be mounted rigidly upon a plate or bracket B having an opening therein adapted to receive the shank, and employing a nut 5 and a lock washer 6 to clamp the same upon the plate or bracket as illustrated in Fig. 4.

The opposite end of body A is of relatively larger diameter than shank 4 and formed with a large axial opening 7 and internal screw-threads 8 extending to within a short distance of a flat bottom or seat 9 within the enlarged middle part of the body. Shank 4 is also formed with a screw-threaded opening or cavity 10 axially thereof and with a shallow cone 11 at the bottom of this cavity. A small fluid passage or bore 12 extends axially through the cone and connects with the larger opening 7 within the opposite end of the body. A tubular nut or male coupling member C having a flaring mouth 14 is sleeved over a flanged tube 15 of copper or other soft metal, and the flanged end of this tube is clamped detachably and with fluid-tight effect against the cone when the nut is screwed into shank 4. In that connection note that the wrench engaging part 16 of coupling nut C is smaller than the outer screw-threaded diameter of shank 4, thus permitting the clamping nut 5 to be sleeved over these parts without disconnecting the tube.

The copper tubes used in a hydraulic brake system for an automobile are of relatively small diameter and extend to different parts on the running gear and also on the chassis frame and body of the vehicle, but the body is spring-supported and moves relatively to the running gear. Therefore, the hydraulic system includes freely flexing tubes as well as copper or metal tubes, and the present coupling member or fitting is particularly constructed to unite a flanged copper tube and a freely-flexing tube of larger diameter to each other and also to connect them jointly to a supporting member or part on the automobile. The larger screw-threaded opening 7 in fitting A is designed to receive the large freely-flexing tubes which may be secured therein by any suitable male coupling member or device introduced within opening 7 opposite the seat therein.

What I claim, is:

1. A tube coupling device for hydraulic brake systems in automobiles, comprising an attachment member having a straight, externally threaded shank adapted to be secured to a fixed part of an automobile, said shank being formed with an internally screw-threaded opening axially thereof and a sealing cone at the base of said opening, and the opposite end of said member having a second screw-threaded opening of larger diameter than the opening in the shank and a flat sealing seat at the base thereof, and the middle portion of said member having a fluid-passage connecting said openings.

2. A tube coupling for use in hydraulic brake systems in automobiles, comprising a cylinder member having a reduced straight shank provided with an external screw-thread adapted to permit attachment to a supporting member, and a screw-threaded opening axially of said shank having a conical bottom and a fluid passage extending therethrough, and said member also having a larger screw-threaded opening at its opposite end formed with a flat bottom open to said fluid passage.

3. A tube coupling for use in hydraulic brake systems in automobiles, comprising a cylindrical member having screw-threaded tube receiving openings of different diameters at opposite ends thereof and formed with a solid wall of substantial thickness between said openings and provided with a shouldered enlargement and screw-threads externally, adapted to secure the said member rigidly upon a supporting part of the automobile the larger opening having a flat annular seat at its base and the smaller opening having a conically-formed bottom with a connecting passage therethrough.

4. A tube coupling for use in hydraulic brake systems in automobiles, comprising a cylindrical member having a reduced straight and externally screw-threaded shank formed with a screw-threaded opening and a cone at the bottom of said opening, and also having a tube receiving opening of larger diameter axially at the opposite end thereof and a fluid-passage connecting said openings, said shank being adapted to be extended into a perforation of a fixed part of an automobile and to seat and clamp said coupling rigidly against said part by means of a nut screwed upon said shank, and a flanged tube having a male coupling member coupled with said shank and clamped against the cone therein.

5. A tube coupling for use in hydraulic brake systems in automobiles, comprising a cylindrical member made of bar stock having a hexagonal enlargement at its middle and a reduced straight shank formed with external screw-threads and also a screw-threaded cavity and a cone at the bottom of said cavity, and also having a relatively larger cylindrical extension with a tube receiving opening of larger diameter than said cavity, including a fluid-passage axially between said cavity and opening, in combination with a small nut extending into said cavity having a flaring mouth adapted to clamp a flanged tube against said cone, said shank being adapted to be extended into the perforation of a part of an automobile and to rigidly secure said member to said part by means of a nut screwed home upon said shank.

In testimony whereof I affix my signature.

JOHN D. BALDWIN, Jr.